H. C. WERMAGER.
ATTACHMENT FOR PLOWS.
APPLICATION FILED SEPT. 18, 1916.

1,337,421.

Patented Apr. 20, 1920.
2 SHEETS—SHEET 1.

WITNESSES
R. D. Williams.
Wm. H. Mulligan

INVENTOR
HENRY C. WERMAGER
BY Richard B. Owen,
ATTORNEY

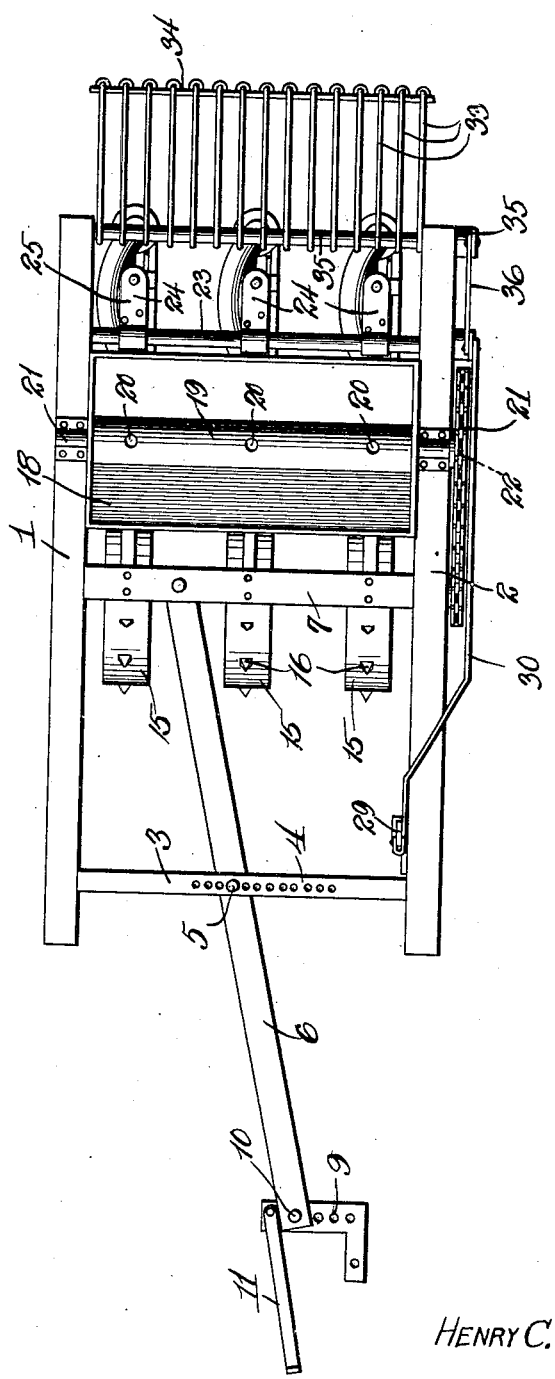

UNITED STATES PATENT OFFICE.

HENRY C. WERMAGER, OF EMERSON, NORTH DAKOTA.

ATTACHMENT FOR PLOWS.

1,337,421.   Specification of Letters Patent.   Patented Apr. 20, 1920.

Application filed September 18, 1916. Serial No. 120,794.

*To all whom it may concern:*

Be it known that I, HENRY C. WERMAGER, a citizen of the United States, residing at Emerson, in the county of Dunn and State of North Dakota, have invented certain new and useful Improvements in Attachments for Plows, of which the following is a specification.

This invention relates to an attachment for a disk plow or sulky plow and more particularly to a combination packer, seed drill and harrow.

The primary object of the device is to provide a mechanism for packing the soil which may be attached to a plow and travel directly behind the same for operating upon the ground after the soil has been plowed.

As a further object of the invention the attachment includes a seed drill and drop adapted to travel behind each of the mentioned packer wheels whereby the seed may be deposited in the freshly plowed and moist soil thereby giving the seed advantage over the device employed for planting seed after the ground has been plowed and considerable time elapsed between the two operations.

The invention also contemplates the provision of a harrow mounted to travel directly behind the packer and the seed drill attachment whereby the surface of the ground will be worked in a manner most advantageous to the seed planted therein.

A further object of this invention is the provision of an attachment for a disk plow or sulky plow which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which:

Fig. 2 is a top plan view.

Figure 1:
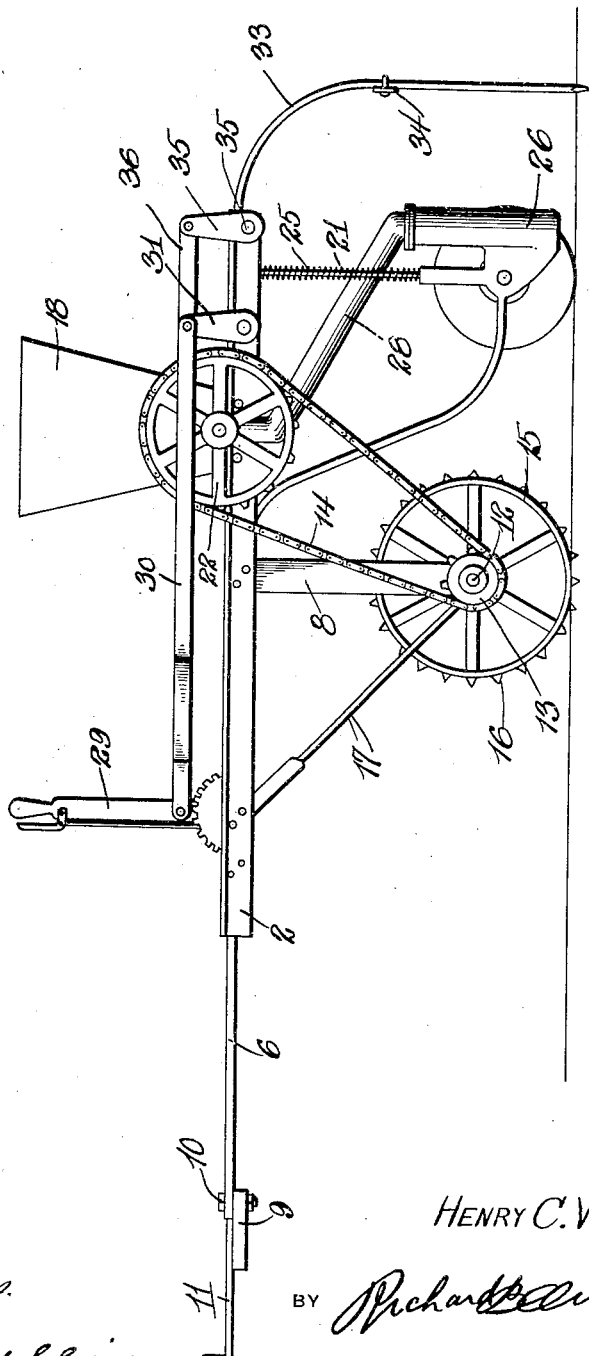
Figure 1 is a side elevation.

Referring to the drawing, wherein is illustrated the preferred form of my invention, and in which like numerals of reference indicate corresponding parts throughout the several views, the side frame bars 1 and 2 are constructed of lengths of angle iron and the front ends of the bars are connected by the tongue adjusting bar 3 any one of which is designed to receive a locking pin 5 having its end connected to the draft tongue 6. The rear end of the draft tongue is fastened to the cross piece 7 of the U-shaped supporting yoke which is provided with the vertical standards 8. The supporting yoke is fastened to the side bars 1 and 2 for disposing the side bars which constitute the frame at the proper distance above the ground. Pivotally mounted at the forward end of the tongue 6 is an equalizer arm 9 having a plurality of openings for receiving the connecting pin 10 whereby the equalizer arm 9 may be adjusted on the end of the tongue. A connecting link 11 is fastened at one end to the equalizer bar and is adapted to have its opposite end fastened to the rear of a sulky plow so that the device will travel behind the plow and operate upon the freshly plowed ground.

An axle 12 has its ends supported by the ends of the vertical uprights 8 and one end of the axle is projected beyond the corresponding upright and receives a sprocket wheel for meshing with a chain 14. A plurality of packer wheels 15 are mounted upon the axle 12 and are provided with a plurality of cleats 16. In addition to supporting the frame of the device, these packer wheels are designed to pack the soil, after being plowed, and are disposed directly in front of the path of movement taken by the said drills hereinafter described. Truss rods 17 have their lower ends connected to the axle 12 and their opposite ends fastened to the side bars 1 and 2 for preventing the support from buckling while the device is being moved across the ground.

A seed hopper 18 is mounted upon the frame and rotatably mounted within the hopper at the bottom thereof is a seed ejecting roller 19 comprising a hollow cylindrical member provided with a plurality of longitudinally spaced apertures 20, each one of which is in longitudinal alinement with the center of the corresponding packer wheel. The roller 19 is provided with a trunnion at each end projected through the end walls of the hopper and rotatably mounted in bearings 21 carried by the side bars 1 and 2. The trunnion at one end of the roller is elongated and extends beyond the bearings 21 for receiving a sprocket wheel 22 adapted to mesh with the chain 14 as clearly shown by Fig. 1 of the drawing. Thus, when the packer wheels are rotated the sprocket wheel 13 will cause the sprocket wheel 22 to be rotated thereby rotating the cylinder 19 which will eject one or more seeds from the hopper according to the size of the openings 20 in the roller 19.

A shaft 23 has its ends rotatably mounted in the side bars 1 and 2 and is mounted in position directly behind the hopper 18. Operating arms 24 are connected to the shaft and the free ends of the arms receive the upper ends of suspension rods 25 the lower ends of which are connected to the seed drills 26. Coil springs 27 are arranged upon each of the rods 25 and are interposed between the arms 24 and the seed drills whereby the seed drills will be normally held in engagement with the ground. Tubular seed chutes 28 are connected to the hopper 18 and to the seed drills 26 for permitting the seeds which are ejected by the roller 19 to pass into the seed drills where they will be properly embedded in the ground.

An operating lever 29 is pivotally mounted adjacent the forward end of the side bar 2 and is connected to a connecting lever 30 which has its rear end fastened to one end of a link 31 carried by the outer end of the shaft 23. This construction will permit the shaft to be rotated whereby the arms 24 may be raised for raising the seed drills out of contact with the ground.

Mounted in the extreme rear ends of the side members 1 and 2 is another shaft 32 to which are connected the upper ends of the spring harrow tines 33 all of which are connected together, intermediate their ends, by the brace bar 34 so that the tines will be raised and lowered simultaneously when the shaft 32 is rotated. For rotating the shaft 32 a link 35 similar to the link 31, is carried by the end of the shaft and its opposite end is fastened to a connecting link 36 which is also fastened to the member 31 whereby the shaft 32 and the shaft 23 will be simultaneously rotated when the lever 29 is swung on its pivot. Thus the seed drills and the harrow tines, which constitute the drag, will be raised simultaneously out of engagement with the ground.

From the foregoing it will be observed that a very simple and durable attachment for a disk plow or sulky plow has been provided, the details of which embody the preferred form. I desire it to be understood however, that slight changes in the minor details of construction may be made without departing from the spirit of the invention or the scope of the claim hereunto appended.

I claim:

A device of the character described comprising a frame having a hopper mounted thereon, a rotatable hollow tubular member mounted in the bottom of the hopper and provided with a plurality of longitudinally spaced apertures, the said tubular member having its ends provided with projections journaled in the frame to rotatably support the said tubular member, one of the said projections having a driving element to impart rotary movement to the tubular member, and discharge members connected to the bottom of the hopper and adapted to register with the said openings in the tubular member when the latter is rotated.

In testimony whereof I affix my signature in presence of two witnesses.

HENRY C. WERMAGER.

Witnesses:
ALF. O. NELSON,
Mrs. ALF. O. NELSON.